US006084960A

United States Patent [19]

Bailly

[11] Patent Number: 6,084,960

[45] Date of Patent: Jul. 4, 2000

[54] POWER SUPPLY CIRCUIT USING A CONSTANT CURRENT AND TELEPHONE APPARATUS INCLUDING SUCH A CIRCUIT

[75] Inventor: Patrick Bailly, Caen, France

[73] Assignee: U.S. Philips Corporation, New York, N.Y.

[21] Appl. No.: 09/012,322

[22] Filed: Jan. 23, 1998

[30] Foreign Application Priority Data

Jan. 28, 1997 [FR] France .................................. 97 00896

[51] Int. Cl.[7] ...................................................... H04M 1/00

[52] U.S. Cl. ............................................ 379/413; 379/399

[58] Field of Search .................................... 379/412–414, 379/398–401

[56] References Cited

U.S. PATENT DOCUMENTS 5,608,795 3/1997 Gay ........................................ 379/399
5,953,409 9/1999 Carlsen .................................. 379/399

FOREIGN PATENT DOCUMENTS

0681389A2 11/1995 European Pat. Off. ......... H04M 1/00

*Primary Examiner*—Wing F. Chan
*Attorney, Agent, or Firm*—Jack D. Slobod

[57] ABSTRACT

The present invention relates to a power supply circuit SC receiving a power supply current IS at an input voltage VLN and intended to supply a voltage VDD, comprising

- a capacitance CS,
- a first transistor T1 enabling the capacitance CS to be charged by means of the power supply current IS,
- a second transistor T2 enabling said charge to be interrupted by diverting the power supply current IS to the reference terminal VSS, and
- a control module T3, T4 controlling the conductance of the first and second transistors T1 and T2 as a function of the values of the input and output voltages VLN and VDD.

According to the invention, the power supply circuit SC also comprises a measuring module with which the value of the power supply current IS can be controlled.

4 Claims, 1 Drawing Sheet

POWER SUPPLY CIRCUIT USING A CONSTANT CURRENT AND TELEPHONE APPARATUS INCLUDING SUCH A CIRCUIT

BACKGROUND OF THE INVENTION

The invention relates to a power supply circuit for a telephone apparatus, provided with an input terminal, an output terminal and a reference terminal whose potential is intended to serve as a reference potential for the whole circuit, the input terminal and the reference terminal being intended to be connected via a rectifier bridge to a telephone line and to receive and supply a current referred to as power supply current, said power supply circuit comprising:

- a capacitance arranged between the output terminal and the reference terminal,
- a first transistor with its collector-emitter path arranged between the first input terminal and the output terminal,
- a second transistor with its collector-emitter path arranged between the input terminal and the reference terminal, and
- a control module intended to make a comparison between the potential of the input terminal and that of the output terminal and to introduce a conduction current and a current complementary thereto into the bases of the first and the second transistor, respectively, the values of said currents depending on the result of the comparison and their sum being referred to as the bias current.

A power supply circuit of this type is known from European patent application 0 681 389 A2. The function of this circuit is to supply a voltage from its output terminal, intended as a power supply voltage for other circuits within the telephone apparatus after having been regulated by means of an appropriate device. In this power supply circuit, the first transistor is turned on by means of the conduction current when the potential of the output terminal is lower than that of the input terminal. This allows the charging of the capacitance by means of the power supply current. When the latter is higher than the current which is necessary for charging the capacitance in the normal operating conditions of the circuit, the current surplus is diverted towards the reference terminal via the second transistor whose base then receives a current which is complementary to the conduction current and has a value which is sufficiently large to start the conductance of this second transistor. If the potential of the input terminal becomes lower than that of the output terminal, the base of the second transistor receives a current which is sufficiently large to enable this transistor to convey the total quantity of power supply current, while the conduction of the first transistor, and thus the charge of the capacitance, are then interrupted.

This operation theoretically enables the power supply circuit to supply an output voltage which can be used for power supply purposes, while pulling a power supply current of a constant value. Indeed, if the value of the current pulled were varied, this would cause a change of information which, in a telephone apparatus, are materialized by the AC component of a current, referred to as line current, from which the power supply current is taken.

However, it is known that the gain of a transistor is dependent on the value of the current flowing through its collector-emitter path. A strong variation of the current flowing through the first or second transistor thus involves a considerable variation of the instantaneous gain. If the bias current is maintained constant, this means that the current used by the power supply circuit can be caused to vary. Moreover, a variation of collector-emitter voltages of the first and second transistors due to variations of the potential of the input terminal introduces, due to the Early effect, variations of the values of the currents flowing through these transistors. These phenomena cause variations of the value of the current used by the power supply circuit and thus disturb the information conveyed by the line current, which is not acceptable.

OBJECTS AND SUMMARY OF THE INVENTION

It is an object of the present invention to remedy this drawback by providing a power supply circuit in which the current used by the power supply circuit is subjected to such a control that its value is substantially constant.

According to the invention, a power supply circuit as described in the opening paragraph is therefore characterized in that it also comprises a measuring module provided with means for making a comparison between the value of the power supply current and a predetermined threshold, and for varying the value of the bias current in the reverse direction of the variations of the result of said comparison.

If, in such a power supply circuit, for example the power supply current increases to a significant extent, i.e. to beyond the threshold value, this variation is detected and causes a reduction of the bias current and thus of the values of the base currents of the first and second transistors, so that the current effectively pulled by the power supply circuit keeps a constant value, which current is, for example, equal to the product between the gain and the conduction current in the case where only the first transistor is conducting.

A particular embodiment of the invention provides a power supply circuit as described above, which is characterized in that the control module comprises a third and a fourth transistor arranged as a differential pair, the bases of said transistors being connected to the input terminal and the output terminal, respectively, their collectors being connected to the bases of the first and second transistors, respectively, the differential pair being intended to be biased by means of the bias current.

Such a structure of the control module allows easy control of the conduction of the first and second transistors, the potentials of the input and output terminals determining the relative proportions of the collector currents of the third and fourth transistors, and thus the behavior of the first and second transistors whose bases are traversed by said currents. The development of the collector currents of the third and fourth transistors as a function of the values of the potentials of the input and output terminals furthermore allows a progressive switching of the current from one transistor to the other, which enalbes to prevent the generation of noise in the power supply current and thus in the line current, which would happen in the case of an instantaneous switching between one transistor and the other.

An advantageous embodiment of the invention is characterized in that the measuring module comprises:

- a current mirror, of which an input branch is connected to a first current source supplying a first current having a predetermined value, and an output branch is connected to the interconnected emitters of the transistors of the differential pair,
- a current divider having an input intended to receive a signal which is representative of the power supply current, and an output which is intended to supply a current having a value which is a fraction of that of the power supply current,
- a second current source intended to supply a second current of a predetermined value, connected between the output of the current divider and the reference terminal, and a fifth transistor having its base connected to the output of the current divider, and its collector-emitter path arranged between the input branch of the current mirror and the reference terminal.

This embodiment is advantageous because of its simplicity and flexibility of use. Indeed, in this power supply circuit, the bias current is equal in a first, starting phase to the value of the current supplied by the first current source. When in a second, permanent phase the output current of the current divider becomes greater than the value of the current supplied by the second current source, which is equivalent to the value of the power supply current being higher than a threshold whose value is given by the product between the value of the current supplied by the second current source and the ratio between the value of the power supply current and that of the output current of the divider, the fifth transistor becomes conducting and diverts towards the reference terminal a part of the current supplied by the first current source, thus reducing the value of the bias current. The value of this diverted current is higher as the difference between the value of the line current and the threshold is higher. The magnitude of the effected compensation is thus automatically adapted to the magnitude of the variation of the power supply current.

A power supply circuit of this type may be used for the electric power supply of various circuits within a telephone apparatus. The invention thus also relates to a telephone apparatus comprising:

a rectifier bridge having two AC terminals intended to be connected to a telephone line, a first and a second DC terminal intended to supply and receive, respectively, a rectified current referred to as line current, an interface module connected between the DC terminals and particularly intended to process the information conveyed by the line current, and a microcontroller intended to receive and manage commands given by a user of the apparatus, provided with a positive power supply terminal and a negative power supply terminal which is connected to one of the DC terminals of the rectifier bridge, telephone apparatus characterized in that it also comprises a power supply circuit as described above, whose input terminals are connected to the DC terminals of the rectifier bridge and whose output terminal is connected to the positive power supply terminal of the microcontroller, and a voltage regulation module connected between the output terminal of the power supply circuit and the reference terminal, intended to maintain the average value of the potential of said output terminal constant.

These and other aspects of the invention are apparent from and will be elucidated with reference to the embodiments described hereinafter.

DETAILED DESCRIPTION OF THE PREFERRED EMBODIMENT

Figure 1:
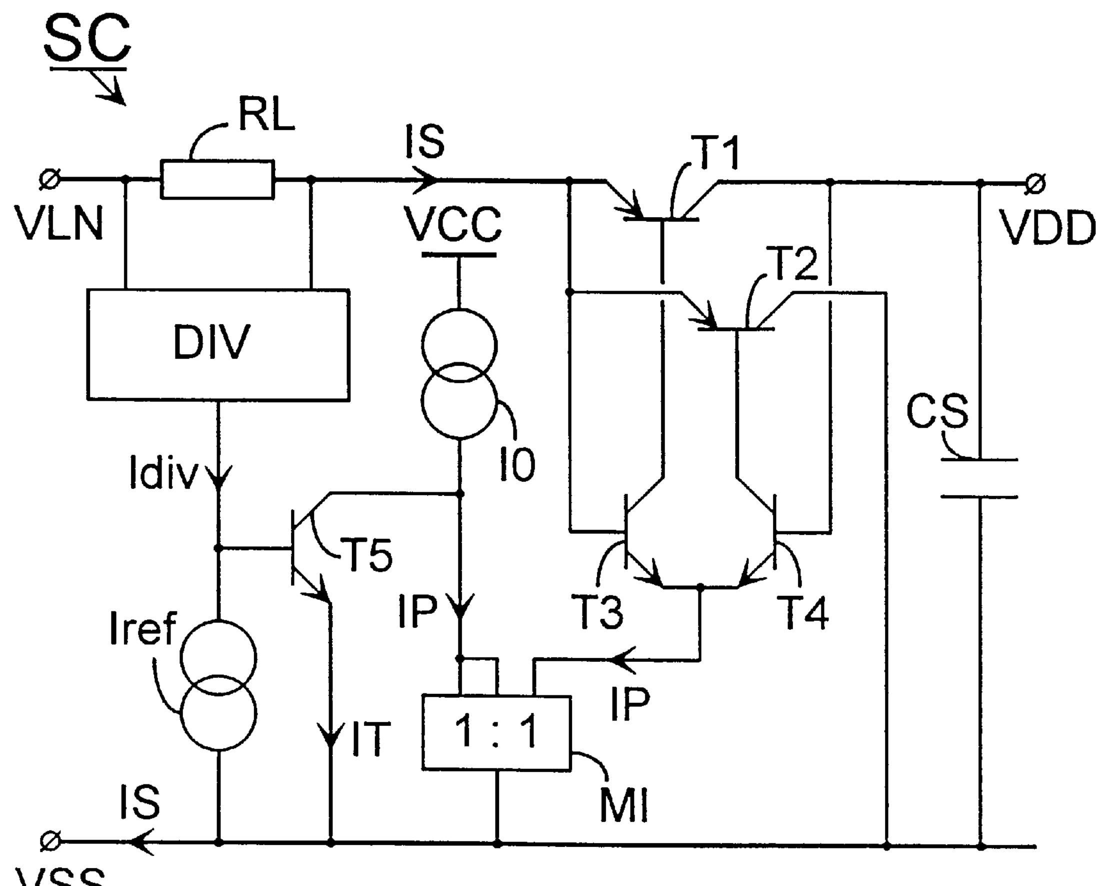
FIG. 1 is an electric circuit diagram of a power supply circuit in accordance with an advantageous embodiment of the invention.

FIG. 1 shows diagrammatically a power supply circuit SC according to the invention. This power supply circuit has an input terminal at a potential VLN, an output terminal intended to supply a voltage VDD and a reference terminal whose potential VSS is intended to be used as a potential reference for the whole circuit. The input terminal and the reference terminal are intended to be connected via a rectifier bridge to a telephone line and to supply and receive a current referred to as power supply current IS. This power supply circuit CS comprises:

a capacitance CS arranged between the output terminal and the reference terminal, a first transistor T1 having its collector-emitter path arranged between the first input terminal and the output terminal, a second transistor T2 having its collector-emitter path arranged between the input terminal and the reference terminal, and a control module comprising a third transistor T3 and a fourth transistor T4 arranged as a differential pair, the bases of these transistors T3, T4 being connected to the input terminal and the output terminal, respectively, their collectors being connected to the bases of the first transistor T1 and the second transistor T2, respectively, the differential pair being intended to be biased by means of a bias current IP.

The differential pair T3, T4 compares the potential VLN of the input terminal with the potential VDD of the output terminal. The collector currents of the transistors T3 and T4 are complementary and control the conduction of the first and second transistors T1, T2. If the potential VLN of the input terminal is higher than the potential VDD of the output terminal, the third transistor T3 is turned on while the fourth transistor T4 is turned off. The first transistor T1 is thus turned on when the second transistor T2 is turned off. This allows charging of the capacitance CS by means of the power supply current IS. If the potentials VLN and VDD are proximate to each other, the third and fourth transistors T3 and T4 each convey a portion of the bias current IP which depends on the relative values of the potentials VLN and VDD. The first and second transistors T1 and T2 then each convey a portion of the power supply current IS which also depends on the relative values of the potentials VLN and VDD. The charge of the capacitance CS is thus maintained. Finally, if the potential VLN of the input terminal is lower than the potential VDD of the output terminal, the third transistor T3 is turned off while the fourth transistor T4 is turned on. The first transistor T1 is thus turned off while the second transistor T2 is turned on. The total amount of power supply current IS is thus diverted to the reference terminal via the second transistor T2 and the charge of the capacitance CS is interrupted. Nevertheless, said capacitance CS supplies the voltage VDD which has been stored at its terminals. The output terminal then supplies a voltage VDD, even in the case where the potential VLN of the input terminal is subjected to a strong instantaneous decrease. It is also possible to provide offset-voltage sources between the input and output terminals and the bases of the third and fourth transistors, respectively, which sources allow fine adjustment of the conditions of conduction of the third and fourth transistors T3 and T4 and thus of the first and second transistors T1 and T2, particularly in the range where the potential VLN of the input terminal and the potential VDD of the output terminal are proximate to each other.

The power supply circuit SC also comprises a measuring module provided with means for comparing the value of the power supply current IS with a predetermined threshold and for varying the value of the bias current IP in the reverse direction of the variations of the result of this comparison. In the embodiment shown in FIG. 1, this measuring module comprises:

a current mirror MI, of which an input branch is connected to a first current source 10 supplying a first current of a predetermined value, and an output branch of which is connected to the interconnected emitters of the transistors T3, T4 of the differential pair, a current divider DIV having an input intended to receive a signal which is representative of the power supply current IS, constituted in this case by a voltage which is present at the terminals of a resistor RL through which said current IS flows, and an output which is intended to supply a current Idiv having a value which is a fraction of that of the power supply current, i.e., for example Idiv=IS/N, a second current source Iref intended to supply a second current of a predetermined value, connected between the output of the current divider DIV and the reference terminal, and a fifth transistor T5 having its base connected to the output of the current divider DIV and its collector-emitter junction arranged between the input branch of the current mirror MI and the reference terminal.

In this embodiment, the bias current IP is equal, during the starting phase, to the value of the current supplied by the first current source IO. When, at the start of the permanent phase, the output current Idiv of the current divider DIV becomes greater than the second predetermined value Iref, which is equivalent to the value of the power supply current IS being higher than a threshold whose value is given by N.Iref, the fifth transistor T5 is turned on and diverts towards the reference terminal a part IT of the current supplied by the first current source 10. The value of the bias current IP thus decreases and is equal to IO-IT. The current IS which is effectively taken for charging the capacitance CS, whose value is equal to β(T1).IP, in which β(T1) represents the gain of the first transistor T1, thus remains at an average constant value. The feedback time of the control loop described above is sufficiently low wich respect to the period of the AC component of the line current, so that the instantaneous variations of the power supply current IS do not have any effect on the information conveyed by said line current. The value of the diverted current IT is higher as the difference between the power supply current IS and the threshold N.Iref is higher. The magnitude of the operated compensation is thus automatically adapted to the magnitude of the variation of the power supply current IS.

Though, in the embodiment described in FIG. 1, the transistors T1 and T2 are transistors of the PNP type and the transistor T5 is an NPN transistor, it is also possible to use transistors of opposite polarities by employing a structure whose principle is similar to that described above, provided that some easily conceivable and realizable arrangements are made by those skilled in the art. In the circuit shown in FIG. 1, the current source IO is arranged between the collector of the fifth transistor T5 and an external voltage source. In a variant of this embodiment, it is possible to connect said collector to the output branch of a second current mirror whose input branch would be connected to the reference terminal via the first current source IO.

Figure 2:
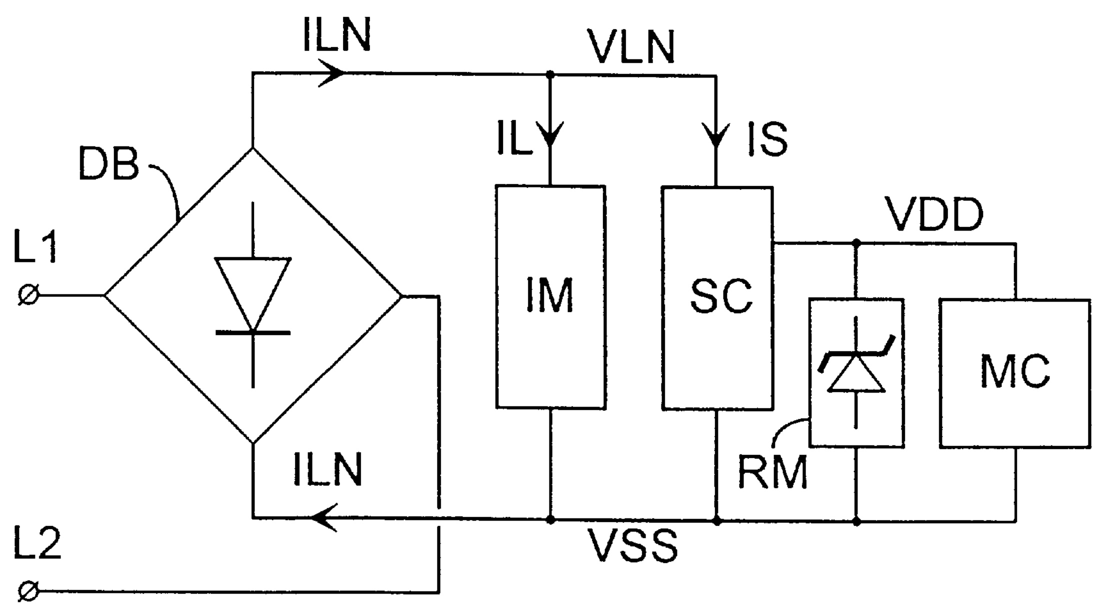
FIG. 2 is a functional diagram of a telephone apparatus including a power supply circuit according to the invention.

FIG. 2 shows diagrammatically a telephone apparatus in which a control circuit in accordance with the invention is used for generating a voltage used for the electric power supply of at least one other circuit included in this apparatus. This telephone apparatus comprises:

a rectifier bridge DB having two terminals L1 and L2 referred to as AC terminals, intended to be connected to a telephone line, first and second DC terminals, intended to supply and receive a rectified current ILN referred to as line current, an interface module IM connected between the DC terminals and particularly intended to process the information conveyed by the line current ILN, and a microcontroller MC intended to receive and control commands given by a user of the apparatus, provided with a positive power supply terminal and a negative power supply terminal which is connected to one of the DC terminals of the rectifier bridge DB.

This telephone apparatus also includes a power supply circuit SC as described above, whose input terminals are connected to the DC terminals of the rectifier bridge DB, and whose output terminal is connected to the positive power supply terminal of the microcontroller MC, and a regulation module RM connected between the output terminal of the power supply circuit and the reference terminal, and intended to maintain the average value of the potential VDD of said output terminal constant.

This structure allows a regulated power supply voltage VDD to be supplied to the microcontroller MC, which voltage has a value depending on the type of regulation module which is used, and which may be, for example, of the order of 3.3 Volts when said module is constituted by a Zener diode. This voltage VDD is elaborated by the power supply circuit SC by means of the power supply current IS, whose DC component's value is small with respect to that of the line current ILN, without the information materialized by the AC component of the line current ILN being disturbed.

I claim:

1. A power supply circuit for a telephone apparatus, provided with an input terminal, an output terminal and a reference terminal whose potential is intended to serve as a reference potential for the whole circuit, the input terminal and the reference terminal being intended to be connected via a rectifier bridge to a telephone line and to receive and supply a current referred to as power supply current, said power supply circuit comprising:

a capacitance arranged between the output terminal and the reference terminal, a first transistor with its collector-emitter path arranged between the first input terminal and the output terminal, a second transistor with its collector-emitter path arranged between the input terminal and the reference terminal, and a control module intended to make a comparison between the potential of the input terminal and that of the output terminal and to introduce a conduction current and a current complementary thereto into the bases of the first and the second transistor, respectively, the values of said currents depending on the result of the comparison and their sum being referred to as the bias current, power supply circuit characterized in that it also comprises a measuring module provided with means for making a comparison between the value of the power supply current and a predetermined threshold, and for varying the value of the bias current in the reverse direction of the variations of the result of said comparison.

2. A power supply circuit as claimed in claim 1, characterized in that the control module comprises a third and a fourth transistor arranged as a differential pair, the bases of said transistors being connected to the input terminal and the output terminal, respectively, their collectors being connected to the bases of the first and second transistors, respectively, the differential pair being intended to be biased by means of the bias current.

3. A power supply circuit as claimed in claim 2, characterized in that the measuring module comprises:

a current mirror, of which an input branch is connected to a first current source supplying a first current having a predetermined value, and an output branch is connected to the interconnected emitters of the transistors of the differential pair, a current divider having an input intended to receive a signal which is representative of the power supply current, and an output which is intended to supply a current having a value which is a fraction of that of the power supply current, a second current source intended to supply a second current of a predetermined value, connected between the output of the current divider and the reference terminal, and a fifth transistor having its base connected to the output of the current divider, and its collector-emitter path arranged between the input branch of the current mirror and the reference terminal.

4. A telephone apparatus comprising:

a rectifier bridge having two AC terminals intended to be connected to a telephone line, a first and a second DC terminal intended to supply and receive, respectively, a rectified current referred to as line current, an interface module connected between the DC terminals and particularly intended to process the information conveyed by the line current, and a microcontroller intended to receive and manage commands given by a user of the apparatus, provided with a positive power supply terminal and a negative power supply terminal which is connected to one of the DC terminals of the rectifier bridge, telephone apparatus characterized in that it also comprises a power supply circuit as claimed in claim 1, whose input terminals are connected to the DC terminals of the rectifier bridge and whose output terminal is connected to the positive power supply terminal of the microcontroller, and a voltage regulation module connected between the output terminal of the power supply circuit and the reference terminal, intended to maintain the average value of the potential of said output terminal constant.

* * * * *